UNITED STATES PATENT OFFICE.

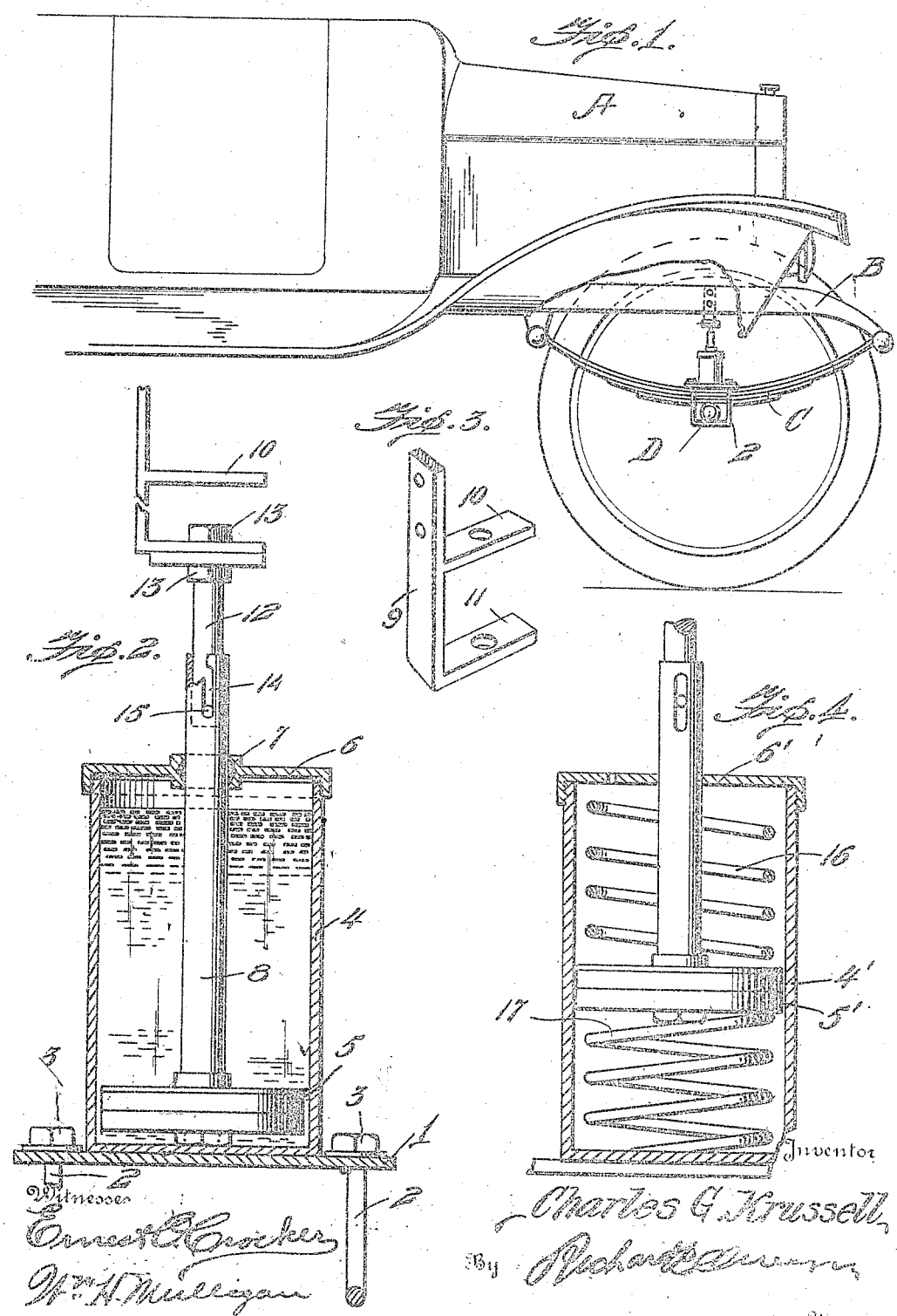

CHARLES G. KRUSSELL, OF FLINT, MICHIGAN.

SHOCK-ABSORBER.

1,260,405.

Specification of Letters Patent.  Patented Mar. 26, 1918.

Application filed April 3, 1916. Serial No. 88,677.

*To all whom it may concern:*

Be it known that I, CHARLES G. KRUSSELL, a citizen of the United States, residing at Flint, in the county of Genesee and State of Michigan, have invented certain new and useful Improvements in Shock-Absorbers, of which the following is a specification.

This invention relates to shock absorbers and the primary object of the invention is to provide means for obviating the jarring, jolting and vibrating of motor vehicles while traveling over rough and uneven road-beds, by taking up the force of the rebound which is too excessive for the ordinary leaf springs to absorb.

The invention further aims to provide a shock absorber which will act directly on the frame of the chassis and in the space between the axle and the frame of the chassis in a direct line, where the greatest rebound naturally occurs when the vehicle passes over uneven places in the road-bed.

As a further object of the invention, the device is constructed so that slight vibration of the vehicle, caused by the motor or power mechanism, may be taken by the leaf springs of the vehicle without necessarily causing movement of the operating piston within the cylinder of the absorber.

A further object of this invention is the provision of a shock absorber which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a fragmentary side elevation of an automobile showing the shock absorber applied thereto.

Fig. 2 is a vertical section through the shock absorber showing the piston in position after receiving a shock.

Fig. 3 is a detail perspective view of the bracket.

Fig. 4 is a section through the cylinder of the shock absorber showing a modification of the shock absorbing means.

The automobile A is provided with the usual chassis which consists of the frame members B, the supporting spring C and the axle D. The spring C is of the semi-elliptical type and rests upon the axle for supporting the frame B of the chassis. Arranged on the top face of the leaf of the spring C is a plate 1 which is secured to the axle by the yokes 2 which are adapted to extend through apertures in the plate 1 and have nuts 3 secured to their ends so that the yokes may secure the plate 1 to the spring C. A cylinder 4 is mounted upon the plate 1 and is arranged in the center of the leaf springs C so that the center line of the cylinder 4 will be directly in the center line of the movement of the spring C. The cylinder is partially filled with oil or other suitable liquid against which the piston 5 is adapted to operate when a shock is received by the vehicle. A cylinder cap 6 is screw threadedly mounted upon the cylinder 4, and has the stuffing box 7 so that the oil will be prevented from leaking through the opening provided for the piston rod 8 when the piston 5 is moved in the cylinder. The piston 5 is slightly smaller in diameter than the inside diameter of the cylinder 4 thus allowing room for the oil to pass the piston 5 when it is moved in the cylinder.

Mounted upon the frame B of the chassis is a bracket 9 the vertically extending arm of which is provided with apertures for receiving bolts, screws or other fastening elements for securing the bracket to the frame B of the chassis. An extension 10 is integrally formed with the vertical arm of the bracket and extends at right angles thereto and upon which the frame B is adapted to be received. A right angularly disposed brace arm 11 is also integrally formed with the vertical arm of the bracket and at one end thereof. The piston rod 8 is provided with an extension rod 12 which is telescopically mounted in one end of the piston rod 8 and one end of the rod is secured in the arm 11 of the bracket by means of the nuts 13. Vertically arranged slots 14 are formed in one end of the piston rod 8 and pins 15, which are mounted in the extension rod 12, have their ends extending into the slots 14 so that a limited telescopical movement of the extension rod 12 is provided.

In its normal position the piston rod 5 will be in the center of the cylinder 4 and the pins 15 will be in the center of the slots 14. The ordinary vibration caused by the motor or power mechanism of the vehicle will be taken by the leaf springs 6 and, by virtue of the slots 14, the piston will be prevented from moving in the cylinder 4 until such a shock occurs that will be too accessive to be taken up by the springs C. By mounting the cylinder in the center of the spring C and in a direct line between the frame and the axle, the slightest jarring occasioned by any unevenness in the road-bed, too excessive to be absorbed by the leaf springs, will cause the piston 5 to move vertically in the cylinder 4 and the contents of the cylinder will, by the restricted passage provided for it between the cylinder of the piston, cause the piston to be gradually retarded in its movement. When the vehicle again assumes its normal position the spring 5 will cause the piston to gradually move back to its position in the center of the cylinder 4 where it will be ready to act upon the next occurrence of a shock.

In the modification of the device which is shown in Fig. 4, the cylinder is provided with coil springs which are interposed between the ends of the cylinder of the piston. The spring 16 is mounted on the top of the piston and acts against the cap 6' of the cylinder 4' and the spring 17 is interposed between the bottom of the piston and the base of the cylinder 4'. From this construction the same functions are obtained that are obtained by the oil or liquid in the cylinder 4 of the preferred form of the device.

From the foregoing it will be observed that a very simple and durable shock absorber has been provided, the details of which embody the preferred form. I desire it to be understood however, that slight changes or modifications in the minor details of construction may be made without departing from the spirit of the invention or the scope of the claim hereunto appended.

I claim:

A shock absorber comprising a cylinder fixedly mounted and having a quantity of liquid contained therein, a piston and piston rod mounted for reciprocatory movement within the cylinder, the piston being slightly less in diameter than the interior diameter of the cylinder, the said piston rod projecting from one end of the cylinder and having its end portion of hollow cylindrical formation, an extension rod telescopically mounted in the said end of the piston rod, a bracket fixed to the end of the said extension and adapted to be supported by the latter, the said extended end of the piston rod having longitudinal slots on opposite sides thereof, pins carried by the said telescopically mounted extension and projecting into the said slots whereby movement of the said extension with respect to the said piston rods is limited by the said slot, the movement of the said piston rod being limited by the length of the said cylinder.

In testimony whereof I affix my signature in presence of two witnesses.

CHARLES G. KRUSSELL.

Witnesses:
 EDWIN M. STERNER,
 J. MAYFIELD.